March 27, 1934.
O. N. DAVIS
1,952,197
ROTARY ENGINE
Original Filed April 10, 1931    3 Sheets-Sheet 1
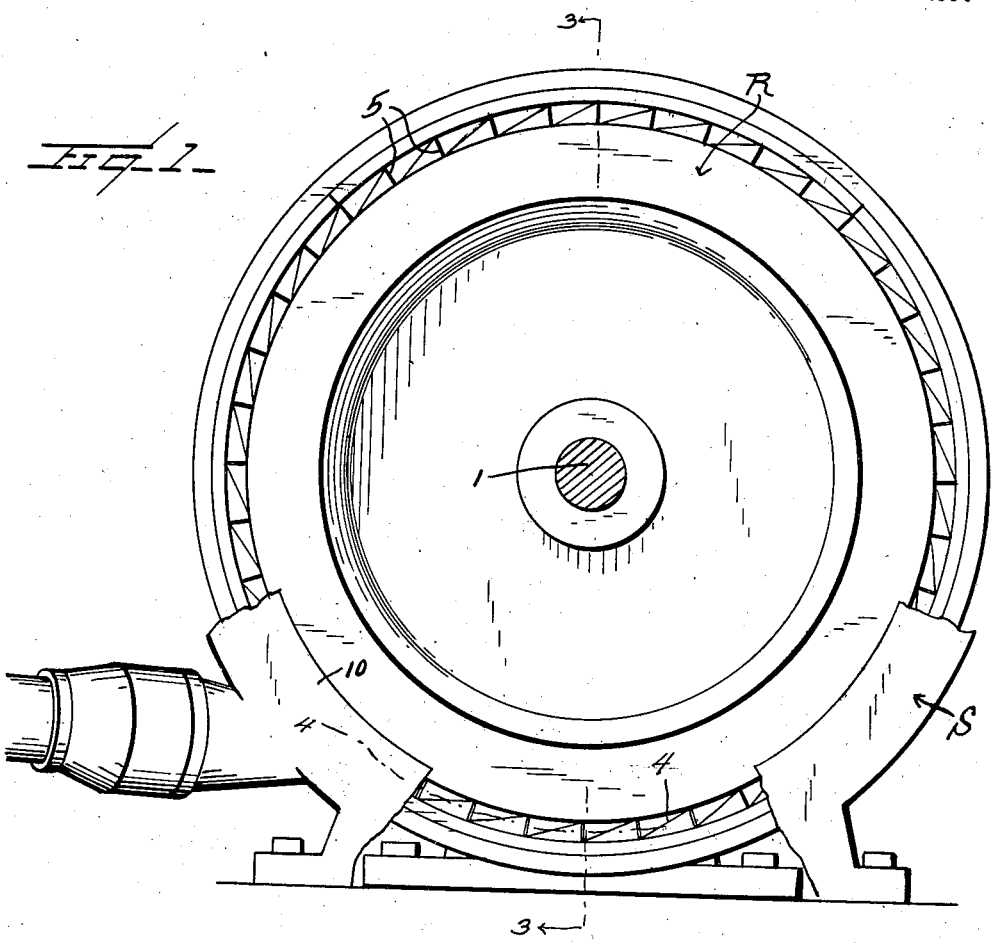
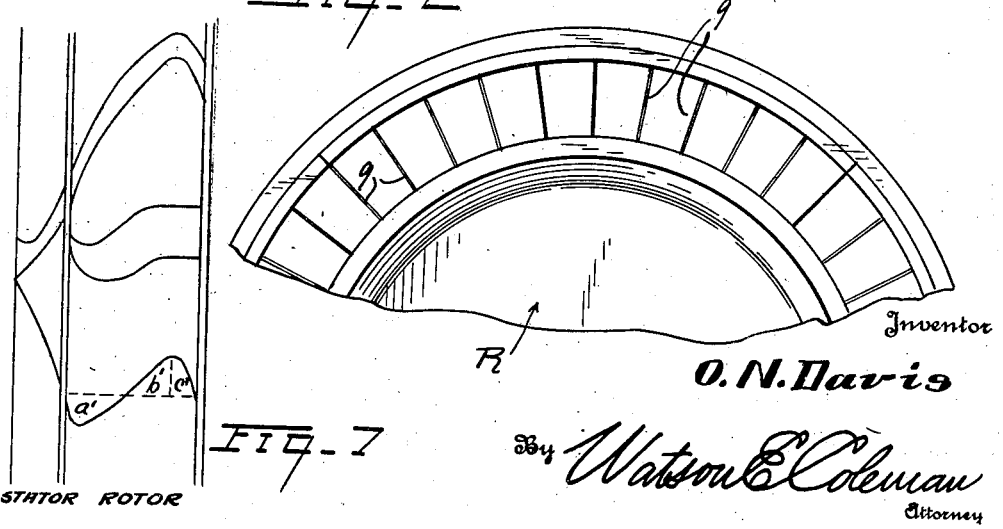
STATOR  ROTOR
Inventor
O. N. Davis
By Watson E. Coleman
Attorney

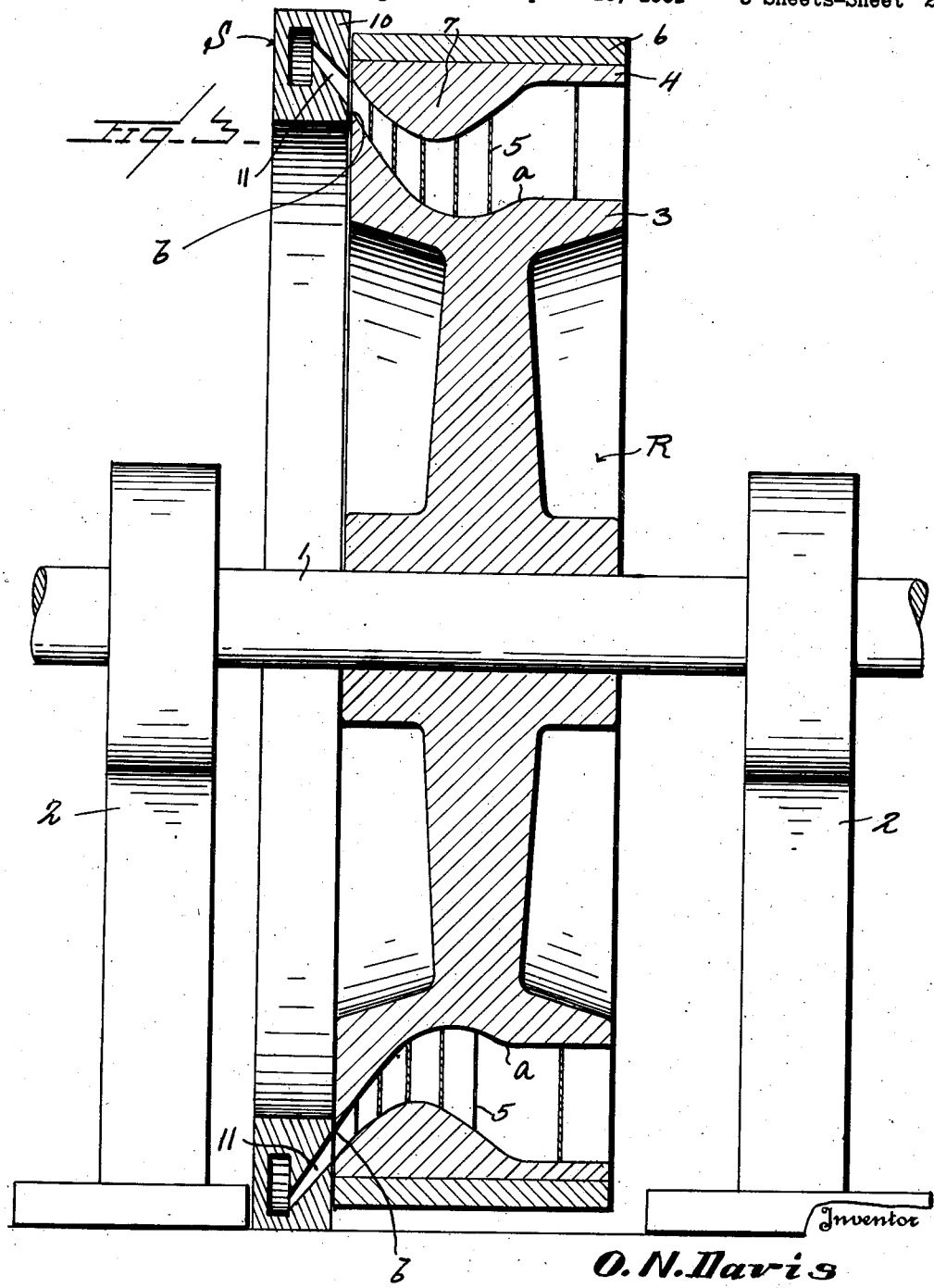

March 27, 1934.  O. N. DAVIS  1,952,197
ROTARY ENGINE
Original Filed April 10, 1931   3 Sheets-Sheet 3
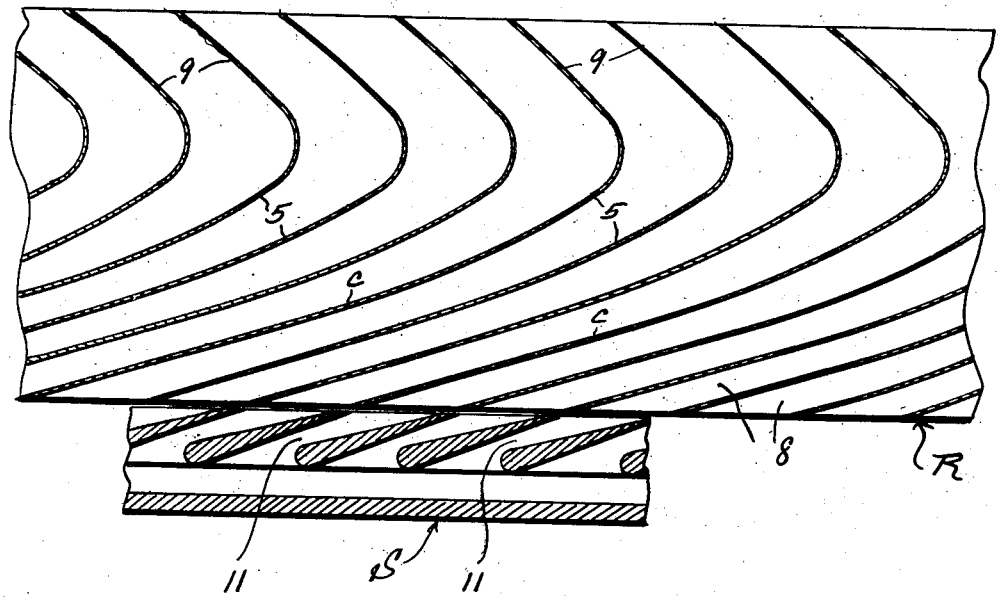
Fig. 4
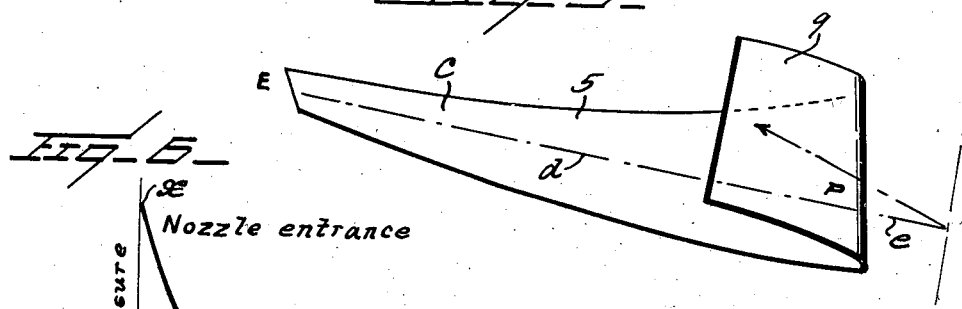
Fig. 5
Fig. 6
Inventor
O. N. Davis
By Watson E. Coleman
Attorney Patented Mar. 27, 1934

1,952,197

UNITED STATES PATENT OFFICE 1,952,197

ROTARY ENGINE

Oscar N. Davis, Liberal, Kans.

Application April 10, 1931, Serial No. 529,223
Renewed January 31, 1933

5 Claims. (Cl. 253—57)

This invention relates to rotary engines and has relation more particularly to an engine of this kind of a turbine type using an elastic fluid as its working medium, and it is primarily an object of the invention to provide a motor of this kind wherein the elastic medium during part of its working cycle is below stage pressure whereby is provided a motor wherein the elastic medium travels in the same general direction as the direction of rotation of the rotor comprised within the engine structure.

Another object of the inventon is to provide an engine of this kind comprising an assembly constituting a stator and a rotor, the stator being provided with means to deliver elastic medium under desired pressure within a series of circumferentially spaced and arranged passageways on the rotor and wherein each of the passageways gradually increases in cross sectional area from its inlet end toward its egress end.

It is also an object of the invention to provide an engine of this kind comprising a rotor having there-around an annular series of circumferentially arranged passageways, each of said passageways increasing in diameter from its inlet end toward its outlet end, the inlet end portion of the passageway being so directed through the rotor to assure the elastic medium as received within the passageway to travel within said passageway in substantially a straight line during the period the rotor is in motion.

An additional object of the invention is to provide an engine of this kind embodying means whereby a rotor is caused to operate by the potential energy of an elastic medium and whereby is obtained a gradual and continuous transfer of the energy of the elastic medium to the rotor without impact or reaction together with means for using impulse and reaction to cause rotation of the rotor.

The invention consists in the details of construction and in the combination and arrangement of the several parts of my improved rotary engine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in side elevation and partly in section illustrating a rotary engine constructed in accordance with an embodiment of my invention;

Figure 2 is a fragmentary view in side elevation of the upper portion of the device as illustrated in Figure 1 and at the opposite side;

Figure 3 is an enlarged vertical sectional view taken substantially on the line 3—3 of Figure 1;

Figure 4 is an enlarged detailed sectional view taken substantially on the line 4—4 of Figure 1, said figure being flattened out and therefore of a somewhat diagrammatic character;

Figure 5 is a view in perspective unapplied of one of the separating walls between adjacent passageways, the path of the jet of elastic medium being diagrammatically indicated by broken lines;

Figure 6 is a graphical representation of the cycle of the elastic medium.

Figure 7 is a diagrammatic representation of the pressure cycle through one stage.

As disclosed in the accompanying drawings, R denotes a rotor supported or mounted for desired rotation in any preferred manner but herein disclosed as mounted upon a shaft 1 rotatably supported by the bearings 2 outboard with respect to the rotor R. The rotor R comprises two concentric and spaced annular rims 3 and 4, said rims being maintained in desired spaced relation through the instrumentality of the interposed walls or septums 5. The desired assembly, in the present embodiment of my invention, of the rims 3 and 4 together with the interposed walls or septums 5 is maintained by a band 6 surrounding and tightly shrunk upon the outer rim 4. I do not, however, wish to be understood as limiting myself to this specific assembly but, on the contrary, the desired formation of the passageways and adjacent walls or septums may be provided in any manner which fully complies with the requirements of practice.

The peripheral face of the inner rim 3 of the rotor R to one side thereof is initially formed in the present embodiment of my invention with a continuous groove or channel the curvature of which in cross section being irregular with its high point positioned immediately at the side of the rim 3 and, as particularly illustrated in Figure 3, with the opposite end portion of said groove or channel terminating beyond the transverse center of the rim. The peripheral face of the rim 3 from the inner side of the groove or channel in cross section is straight.

The inner face of the outer rim 4 is provided with an inwardly disposed continuous rib 7, the outer face of which being also in cross section disposed on an irregular curvature and on such curvature with respect to the cross sectional curvature of the groove or channel in the rim 3 to provide an intervening space gradually increasing in diameter from the side of the rotor R toward the inner end of the irregular curvatures.

In the embodiment of the invention as particularly illustrated in Figure 3, it is to be noted that the inner side $a$ of the irregular curvature in the peripheral face of the rim 3 is a material distance inwardly in a radial direction of the rotor R with respect to the outer or high side $b$. It is also to be noted that the opposite ends of the irregular cross sectional curvature of the rib 7 are substantially coplanar so that in the assembly of the rims 3 and 4 it is assured that the interposed space will gradually increase in diameter radially of the rotor R.

The walls or septums 5, hereinbefore referred to, are interposed between the rims 3 and 4 of the rotor R and are spaced apart in a direction circumferentially thereof with adjacent walls or septums 5 in relatively close proximity one to the other. As disclosed in the accompanying drawings, the structure is such wherein each of the walls or septums 5 is a separate element, as illustrated in Figure 5, but, of course, this is not essential as it may be possible to produce the wall or septum as a part of either of the rims 3 or 4 or of both.

As herein disclosed, each of the walls or septums 5 has its longitudinal margins disposed lengthwise on such irregular curvatures as to permit said wall or septum to snugly engage between the rims 3 and 4 and more especially that portion of the rim 3 having the groove or channel and the rib 7 of the rim 4. The assembled walls or septums 5 provide therebetween passageways 8 which lead from the side of the rotor R at which the high point $b$ of the rim 3 is positioned, and from this side of the rotor R for a considerable distance each of the walls or septums 5 is disposed circumferentially and on a slightly inwardly disposed angle in the same general direction as the direction of travel of the rotor R as indicated at $c$. In the assembly of adjacent walls or septums 5, as clearly illustrated in Figure 4, the portions $c$ of the walls gradually separate so as to obtain a gradual increased diameter from the inlet end of each of the passageways 8 between the portions $c$. By referring to the diameter of the passageways it is to be understood that this refers to the cross sectional area.

The portions $c$ of the walls or septums 5 are of a length to terminate at substantially the low point $a$ of the groove or channel in the rim 3 and from which point each of the walls or septums 5 is continued by a returned extension 9 terminating at the adjacent side of the rotor R with the space between adjacent extensions 9 opening through said adjacent side and thereby constituting an exhaust. While the portion $c$ of each of the walls or septums 5 has its longitudinal marginal edges on an irregular curvature to assure its proper placement between the rims 3 and 4, it is also to be noted that this portion $c$ is disposed lengthwise on such curvature as to assure the jet of elastic medium within the interposed passageways traveling in approximately a straight line as the rotor is in motion, said travel of the elastic medium being in the same general direction as the direction of rotation of the rotor. The extensions 9 of the walls or septums 5 are disposed in a general direction rearwardly of the direction of rotation of the rotor R and I find it of advantage to employ the same in order to obtain the benefit of the residual velocity present in the travel of the elastic medium when the jet reaches said extensions, it being understood, however, that before reaching the extensions 9 the major portion of the energy of the elastic medium has been transferred to the rotor R.

The smaller ends of the passageways 8 constitute the inlets and an elastic medium is continuously delivered at stage pressure into the passageways 8 through said inlet ends from the stator S. The stator S as herein disclosed comprises an annular manifold of desired capacity in communication in any desired manner with a source of elastic medium, such as steam, compressed air, products of combustion, etc. The stator S is immediately adjacent to the inlet side of the rotor R and the face wall 10 of the stator S immediately opposed to the rotor R is provided therearound with an annular series of jet openings or nozzles 11, said openings or nozzles 11 being preferably of a number equal to the number of passageways 8.

It is to be noted that each of the openings or nozzles 11 from its inlet end to its outlet end is such to assure the elastic medium as immediately discharged therefrom and as initially received within the passageways 8 is at stage pressure. The discharge through the openings or nozzles 11 is continuous while the engine is in operation and in order that a minimum of resistance will be offered to the admission of elastic medium within the passageways 8, the end edges of the walls or septums 5 at the inlet ends of the passageways are preferably formed into knife edges or sharpened.

As the elastic medium enters the passageways 8 said medium will travel within each of the passageways along the line as indicated at $d$ in Figure 5 and as it travels from the inlet of the passageway 8 toward the end of the portion $c$ of the walls or septums 5 of the passageway, the gradual increase in cross sectional area of the passageway from its inlet end toward its egress or discharge end results in a lower pressure within the passageway. In Figure 5 the line $e$ indicates the approximate extent of travel of the rotor R during the time the elastic medium is traveling within the passageway.

In order that the cycle of operation of the engine may be clearly disclosed, attention is particularly directed to the graphic or diagrammatic disclosure in Figure 6 wherein the curve from $x$ to $y$ indicates the action within a jet opening or nozzle 11 and more particularly the increase of velocity of the medum with the proportional fall or reduction in pressure so that the elastic medium immediately as it leaves the jet opening or nozzle $x$ is at stage pressure. The point $z$ indicates the lowest pressure point within a passageway while the line $z$ to $z'$ indicates the travel of the elastic medium through a passageway 8 with a reduction in velocity when the passageway is opened to stage discharge. The broken line from $z$ to $z''$ indicates the low pressure when the passageway is discharging under condensing conditions. The curve $z'$ to $f$ indicates the force of impulse or reaction of the elastic medium upon an extension 9.

In Figure 7 $a'$ represents the area of static pressure action, $b'$ the impulse and $c'$ reaction area (in reality both impulse and reaction).

From the foregoing description it is thought to be obvious that a rotary engine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

In referring, in the foregoing description and in the appended claims, to "stage pressure" it is to be understood that such term or definition is intended to embody or include the pressure of the medium in the space between the stator and the rotor.

I claim:—

1. A rotary engine including a rotor, said rotor comprising two concentric and spaced annular rims, septums interposed between said rims, a member surrounding the outer rim for maintaining the rims and septums in assembled relation, the peripheral face of the inner rim to one side thereof being provided with a continuous channel, said channel in cross section being on an irregular curvature with its high point immediately adjacent to a side of the rim with the opposite or low point of such curvature being beyond the transverse center of the rim, the peripheral face of the rim from the inner side of the channel being straight in cross section, the inner face of the outer rim being provided with an inwardly disposed rib, the outer face of which being in cross section disposed on an irregular curvature and on a curvature with respect to the channel in the inner rim to provide an intervening space gradually increasing in diameter from the side of the rotor to the inner ends of the curvatures, the interposed septums providing passageways, and means for continuously delivering an elastic medium within the passageways through the smaller ends thereof.

2. A rotary engine including a rotor, said rotor comprising two concentric and spaced annular rims, septums interposed between said rims, a member surrounding the outer rim for maintaining the rims and septums in assembled relation, the peripheral face of the inner rim to one side thereof being provided with a continuous channel, said channel in cross section being on an irregular curvature with its high point immediately adjacent to a side of the rim with the opposite or low point of such curvature being beyond the transverse center of the rim, the peripheral face of the rim from the inner side of the channel being straight in cross section, the inner face of the outer rim being provided with an inwardly disposed rib, the outer face of which being in cross section disposed on an irregular curvature and on a curvature with respect to the channel in the inner rim to provide an intervening space gradually increasing in diameter from the side of the rotor to the inner ends of the curvatures, the interposed septums providing passageways, and means for continuously delivering an elastic medium within the passageways through the smaller ends thereof, said septums being disposed in a general direction rearwardly of the direction of rotation of the rotor.

3. A rotary engine including a rotor, said rotor comprising two concentric and spaced annular rims, septums interposed between said rims, the peripheral face of the inner rim to one side thereof being provided with a continuous channel, said channel in cross section being on an irregular curvature with its high point immediately adjacent to a side of the rim with the opposite or low point of such curvature being beyond the transverse center of the rim, the peripheral face of the rim from the inner side of the channel being straight in cross section, the inner face of the outer rim being provided with an inwardly disposed rib, the outer face of which being in cross section disposed on an irregular curvature and on a curvature with respect to the channel in the inner rim to provide an intervening space gradually increasing in diameter from the side of the rotor to the inner ends of the curvatures, the interposed septums providing passageways, and means for continuously delivering an elastic medium within the passageways through the smaller ends thereof.

4. A rotary engine including a rotor, said rotor comprising two concentric and spaced annular rims, septums interposed between said rims, the peripheral face of the inner rim to one side thereof being provided with a continuous channel, said channel in cross section being on an irregular curvature with its high point immediately adjacent to a side of the rim with the opposite or low point of such curvature being beyond the transverse center of the rim, the peripheral face of the rim from the inner side of the channel being straight in cross section, the inner face of the outer rim being provided with an inwardly disposed rib, the outer face of which being in cross section disposed on an irregular curvature and on a curvature with respect to the channel in the inner rim to provide an intervening space gradually increasing in diameter from the side of the rotor to the inner ends of the curvatures, the interposed septums providing passageways, means for continuously delivering an elastic medium within the passageways through the smaller ends thereof, and means for maintaining the rims and septums in assembled relation.

5. An engine comprising a rotor having passageways therethrough, the shape of each of the passageways being such as to effect therein first a reduction of pressure, then a rise in pressure to stage pressure, then by sharp curvature to cause a high rise in pressure by impact, and then lower to stage pressure by reaction.

OSCAR N. DAVIS.